3,118,770
FRUIT JUICE AND METHOD OF PREPARING
SAME
Harry W. Harrell, 3339 Dale Drive, Lakeland, Fla.
Filed Dec. 26, 1961, Ser. No. 162,025
3 Claims. (Cl. 99—105)

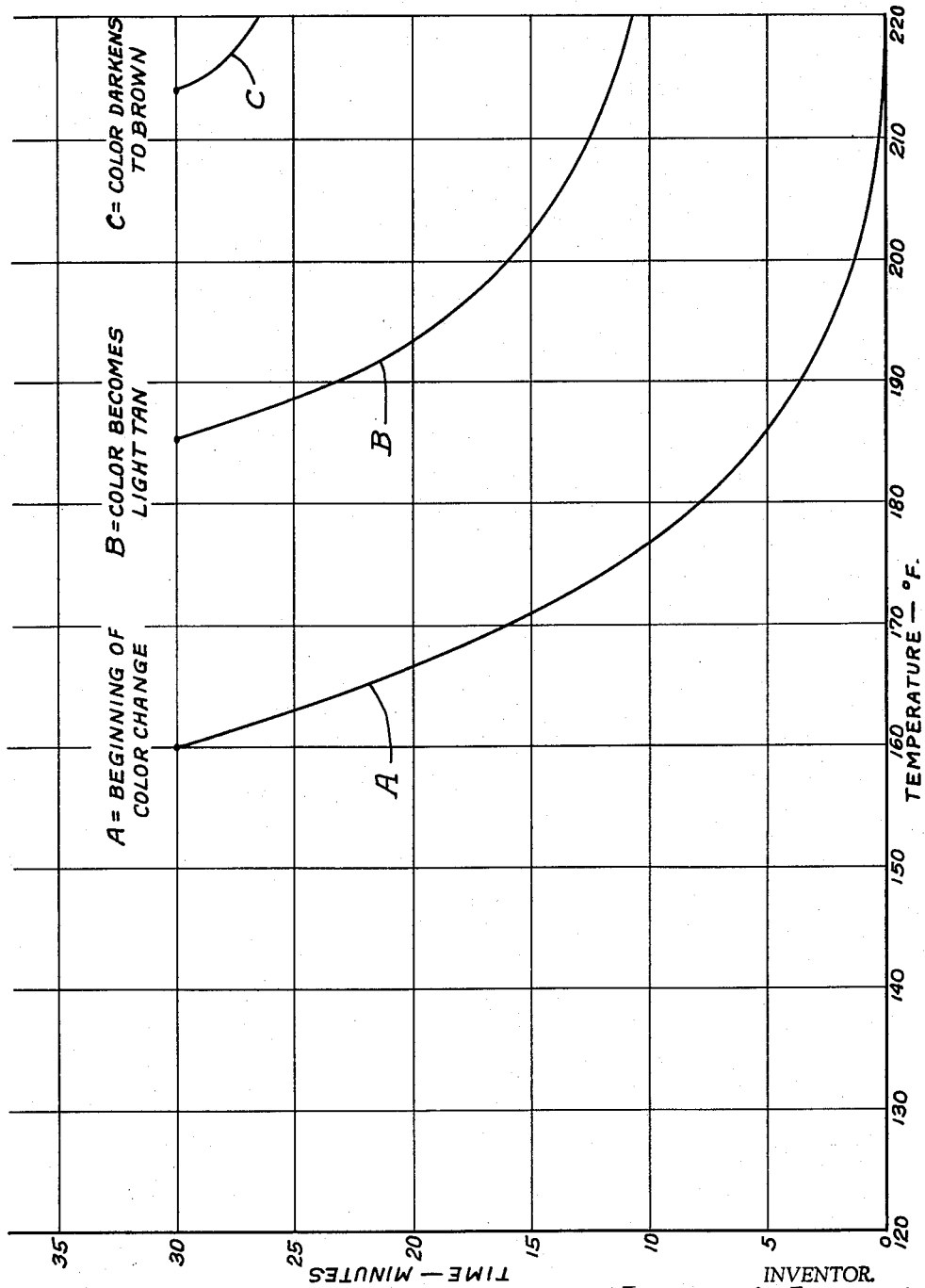

This invention relates to a method for preparing fruit juice and other products resulting therefrom, and more particularly to a method of preparing juice from citrus fruit and the fruit juice produced thereby.

It is a general object of the present invention to produce a new and improved method of preparing fruit juice.

A more specific object of the invention is to produce a method for preparing citrus fruit juices which utilizes a portion of the fruit heretofore unusable except with a resulting degradation of the flavor and appearance of the product.

A further object of the present invention is to provide a process for producing fruit juice wherein the pulp separated from the juice is treated so as to render more soluble the fruit solids contained in such pulp and also to reduce or inhibit the enzyme activity of the pulp and remove from the pulp all undesired volatile flavor characteristics which would otherwise have an adverse effect upon the flavor of the final product.

It is also another object of the invention to produce a citrus fruit juice having improved characteristics of flavor, color, texture and appearance produced by the methods of the present invention.

Other and further objects and advantages of the invention will be readily apparent from the following description and from the accompanying drawing which is a graph illustrating the time-temperatures usable in one step of the process.

In the processing of citrus products, particularly oranges, it is customary to remove the juice from the fruit through the use of specially built juice extractors which operate to squeeze or ream the juice from the fruit in such a manner that the peel and albedo are discarded or conveyed to a drier where it is dried for use as animal feed. The juice from the extractors contains what is normally called pulp and consists of the juice and juice sacs and a portion of the segment membranes. The peel, core and seeds are not included within the definition of "pulp."

In the usual process, the pulp-containing juice from the extractors is then passed through "finishers" wherein the majority of the pulp is screened out of the juice, which pulp is then usually either discarded or dried into animal feed.

It is well known that the pulp separated out by the finishers contains substantial amounts of orange juice solids, pectin, and other valuable constituents of the orange. The juice solids are particularly important inasmuch as the value of the juice upon which payment to the farmer is based, is determined by the quantity of fruit solids in the juice. In normal Florida oranges there is usually about six pounds of fruit solids in the juice produced by a box of oranges, but by my process I can increase the amount of solids by at least one pound.

The loss of fruit solids in the discarded pulp has, as indicated before, been previously recognized and attempts have been made in the past to recover the solids such as by washing the pulp with water, but even in such processes most of the solids were lost and there was of course the added expense of evaporating the wash water to obtain a usable concentration.

In accordance with the present process, however, the pulp is treated in a manner to conserve all of the valuable ingredients thereof including the solids, in such form that it can be utilized in conjunction with orange juice and orange juice products in a most beneficial manner.

It should be pointed out that pulp removed from juice by the finishers contains relatively high concentrations of enzymes which, if allowed to remain active, are very detrimental to orange juice and orange juice products. If pulp containing active enzymes is added to concentrated orange juice, the enzymes produce gelation of the concentrate, probably because of a change in the pectin caused by the enzyme activity. While it is known that enzymes in orange juice may be destroyed by heating, to destroy the enzymes in the pulp by heating does not produce a pulp usable in any significant quantities with orange juice inasmuch as more than a minor amount of pulp gives an unsatisfactory appearance to the product and the pulp itself, even if treated to inactivate the enzymes, still carries into the juice much undesired flavor.

I have been able through my process to treat pulp in a manner which not only inhibits the enzyme activity, it also removes the undesired flavors therefrom and can also be used to reduce the size of the particles forming the pulp so as not to detract from the appearance of the fruit juice if relatively large quantities of the pulp are added thereto.

In accordance with the present invention, I prefer to comminute the pulp from the finisher to completely release the enzymes and other components contained within the pulp particles. The comminuted mass is then heated to a sufficient temperature to destroy the enzymes, or at least inhibit their activity, and then desirably, homogenized so as to yield a smooth paste which may be easily handled and further heated in a uniform manner. Further heating is accomplished in either an open vessel or an enclosed heater, and is carried out to the point where there is a perceptible color change from the normal lemon yellow toward a light tan. If this heating is accomplished in an open kettle at the boiling point of the comminuted homogenized mixture, undesirable flavors which are volatile are removed, while if an enclosed heating system is employed, the homogenized pulp, after being heated, is passed into a vacuum chamber to remove the volatile flavors. After this heat treatment and volatile flavor removal, the product may again be homogenized to obtain an especially smooth mixture since the previous heating processes render the pulp more susceptible to homogenization.

The pulp (after the foregoing treatment, is free from any active form of enzymes which would produce undesirable flavor and physical changes when mixed with orange juice, orange juice concentrate, or other citrus products. The pulp can also be utilized in substantial quantities to produce improved body, flavor and appearance in such products. The process as described not only removes undesirable flavors from the pulp but also, through the heating process, apparently converts a major portion of the pulp into a soluble form of orange solids. Another advantage which may be pointed out is that the pulp treated in accordance with this process has a higher "ratio" than the orange juice from which is was separated. "Ratio" is defined as the percent citric acid divided into the percent soluble solids. Therefore, the higher the ratio the sweeter the product. Since pulp prepared in accordance with my process has a relatively high ratio, it may be utilized to increase the sweetness of low ratio juices. For example, the pulp may be added to the separated juice at a ratio of approximately one part by solids content of the pulp to ten parts by solids content of the juice.

For the heating step, the time and temperature may vary through relatively wide limits. At the outset, the pulp is of a lemon yellow color but after the heating step has commenced, the color will begin to change. The time-temperature relationship to initiate color change is indicated by the curve A of the graph in the accompanying drawing, in which it will be noted that 30 minutes heating at 160° F. down to 1 or 2 minutes at 210° F. will initiate the color change. The preferred ratio of time and temperature is indicated by the curve B, which is anywhere from 30 minutes at approximately 187° F. to approximately 11 minutes at 220° F. The upper limit is indicated by the curve C on the graph. If the time and temperature of the heating step is continued beyond that indicated by the curce C, the color becomes quite dark and a "cooked" flavor may be imparted to the pulp. While, as previously indicated, the time-temperature preferably will fall on the curve B, benefits from the invention can be derived from heating at the temperatures and the time indicated in the area between the curves A and C.

It is apparent from the chart that considering curves A and C, for example, the pulp may be heated to a temperature between 160° F. and 220° F. for a period of from 30 minutes to less than one minute; considering curves B and C, a temperature between 185° F. and 220° F. for a period of from 30 minutes to 10 minutes may be used.

The final homogenized product preferably is reduced to a size that will pass a .060 screen, or finer.

The following is a specific example of my process: 27,000 lbs. of oranges were passed through a juice extractor to obtain 17,400 lbs. of pulpy juice and 9,600 lbs. of peel and seeds. The peel and seeds were discarded. The pulpy juice was then passed through a finisher to yield 15,660 lbs. of screened juice and 1,740 lbs. of pulp. The resulting juice had a soluble solids content, measured by a refractometer, of 13.5% with the pulp having a soluble solids content of 13.2%. This pulp was then comminuted and heated to a temperature of 185° F. and then homogenized at 2,000 p.s.i.g. pressure. The homogenized pulp was then further heated in an open cooking kettle to a temperature of 215° F. and held at this temperature, with agitation, for 15 minutes. The product was then again homogenized at a pressure of 2,000 p.s.i.g. and cooled. The resulting pulp had a soluble solids content of 20.3%. Although some of the increase in solids content was the result of the evaporation of water, it was determined that the soluble solids content increase allowing for the removed water was from 13.2% before processing to 17.0% after processing.

The treated pulp may be mixed with juice, up to 1 part of the treated pulp to 9 parts of juice calculated on a solids basis. Juice to which treated pulp had been added was improved in flavor, body and physical appearance of the juice, and where the juice was concentrated, it improved those characteristics in the reconstituted juice. Gelation studies showed no harmful effects.

Preferably, homogenization is utilized both before and after the final heating. However, a reasonably satisfactory product can be obtained by homogenization only after cooking, especially if good agitation is used during the cooking process.

One further point with regard to my invention when practiced in the usual type of citrus plant having a cattle feed drier as part of the process, is that it permits greater efficiency in respect to tons of dried feed produced per unit of fuel used in drying. This is because the pulp removed from the mixture of peel, seeds and albedo is otherwise that portion of the mixture which not only contains the most water and hence is the most expensive to dry, but is also the most susceptible to producing "fines" and not recoverables.

Having described my invention as related to the embodiments set out herein, it is my intention that the invention be not limited by any of the details of description unless otherwise specified, but rather be construed broadly within its spirit and scope as set out in the accompanying claims.

I claim:

1. The method of preparing a citrus fruit drink which comprises extracting the pulp and juice from the fruit, separating the pulp from the juice, comminuting at least a portion of the pulp and heating the comminuted pulp to a temperature and for a time sufficient to inhibit the activity of enzymes therein and further heating the pulp to a temperature between 160° F. and 220° F. for a period of from thirty minutes to less than one minute, respectively, to change the color thereof to a light tan and to release undesired volatile flavors therefrom, homogenizing the heated pulp and adding the pulp to the separated juice.

2. The method of preparing a citrus fruit drink which comprises extracting the pulp and juice from the fruit, separating the pulp from the juice, comminuting at least a portion of the pulp and heating the comminuted pulp to a temperature of about 185° F. for a time sufficient to inhibit the activity of enzymes therein and then further heating the pulp to a temperature between 160° F. and 220° F. for a period of from thirty minutes to less than one minute, respectively, to change the color thereof to a light tan and to release undesired volatile flavors therefrom, homogenizing the heated pulp and adding the pulp to the separated juice at a ratio of approximately 1 part by solids content of the pulp to 10 parts by solids content of the juice.

3. The method of preparing a citrus fruit drink which comprises extracting the pulp and juice from the fruit, separating the pulp from the juice, comminuting at least a portion of the pulp and heating the comminuted pulp to a temperature of about 185° for a time sufficient to inhibit the activity of enzymes therein, homogenizing the heated pulp and then further heating the pulp to a temperature between 185° F. and 220° F. for a period of from 30 minutes to 10 minutes, respectively, to release undesired volatile flavors therefrom, again homogenizing the further heated pulp and adding the pulp of the separated juice at a ratio of approximately 1 part by solids content of the pulp to 9 parts by solids content of the juice.

References Cited in the file of this patent

UNITED STATES PATENTS 2,724,652    Brent  ---------------- Nov. 22, 1955